United States Patent [19]

Jewell

[11] Patent Number: 4,583,297

[45] Date of Patent: Apr. 22, 1986

[54] POSITION SENSING APPARATUS

[75] Inventor: George S. Jewell, Kingston, Canada

[73] Assignee: Westinghouse Electric Corp., Pittsburgh, Pa.

[21] Appl. No.: 678,520

[22] Filed: Dec. 5, 1984

[30] Foreign Application Priority Data

Mar. 21, 1984 [CA] Canada .................................. 450131

[51] Int. Cl.⁴ .............................................. G01B 7/28
[52] U.S. Cl. ......................................... 33/533; 33/552; 33/553; 33/572; 33/392
[58] Field of Search ................. 33/533, 552, 551, 553, 33/556, 557, 560, 572, 286, 392, 402, 558, 366, 568, 573

[56] References Cited

U.S. PATENT DOCUMENTS

| | | | |
|---|---|---|---|
| 3,303,571 | 2/1967 | Veals | 33/558 |
| 3,593,427 | 7/1971 | Abarotin | 33/556 |
| 3,594,909 | 7/1971 | Schultz | 33/552 |
| 3,597,849 | 8/1971 | Gaal | 33/552 |
| 3,918,167 | 11/1975 | Gerber | 33/568 |
| 3,925,636 | 12/1975 | Coleman | 33/533 |
| 3,962,693 | 6/1976 | Schamblin | 33/366 |

Primary Examiner—Willis Little
Attorney, Agent, or Firm—D. E. Erickson

[57] ABSTRACT

The present invention relates to a sensing apparatus for sensing the displacement of a movable object relative to its ideal vertical path of travel. The apparatus includes two elongate reference wires extending parallel to the ideal vertical path of travel of the object. The apparatus further includes two sensing devices mounted for movement with the object. Each of the sensing devices is normally positioned a predetermined distance from a respective one of the reference wires such that engagement of the reference wire by the sensing device indicates that the object has been displaced about or from its expected predetermined path of travel.

12 Claims, 4 Drawing Figures

POSITION SENSING APPARATUS

BACKGROUND OF THE INVENTION

The present invention relates to a position sensing apparatus. It should be understood that, while the specification describes the position sensing apparatus as being used in an apparatus for measuring the surface positions of an elongate article of manufacture, the position sensing apparatus of the present invention may find other applications.

It is often necessary to measure an elongate article of manufacture such as, for example, a beam or a tubular member to determine if there are errors in the formation of the article. This may involve testing the surfaces of the article to determine the extent the article bows or twists from its theoretical longitudinal axis. It should be understood that this testing or measuring is usually confined to articles of manufacture for which it is critical that the article be manufactured straight within predetermined specifications or tolerances. One such article of manufacture, for which the straightness of the article and its surfaces is critical, is a tubular coolant channel for use in nuclear fuel power reactors.

It is known to measure the surfaces of the article at predetermined intervals along its longitudinal axis by use of transducers and the like. The transducers are carried on a carriage which moves along a pair of guide rails. It is not economically practical however, to make the rails on which the carriage moves absolutely straight, and it is not practical to expect these rails to remain free of flaws once in use. Accordingly, this type of measuring apparatus, which uses a carriage movably mounted on a rail, does not compensate for any deviation of the carriage from its expected path of travel defined by the rails. The error introduced by the guide rails introduces inaccuracies into the measurement of the surface positions of the elongate article. The error introduced may be sufficient to render any measurement of the elongate apparatus by the transducers outside accepted tolerances.

SUMMARY OF THE INVENTION

It is therefore an object of the present invention to provide a position sensing apparatus which is capable of sensing the displacement of an object relative to its ideal vertical path of travel.

It is another object of the present invention to provide a position sensing apparatus which senses the displacement of an object beyond a predetermined amount relative to its ideal vertical path of travel.

It is another object of the present invention to provide a position sensing apparatus which senses and measures the displacement of an object relative to its ideal vertical path of travel.

In accordance with one aspect of the present invention there is provided a position sensing apparatus for sensing displacement of a movable object relative to its ideal vertical path of travel. The apparatus includes two elongate reference means extending parallel to the ideal vertical path of travel of the object, and sensing means mounted for movement with the object. The sensing means is normally positioned a predetermined distance from each of said elongate reference means whereby engagement of at least one of said elongate reference means by said sensing means is indicative of displacement of said object relative to its ideal vertical path of travel.

By having the sensing means normally positioned a predetermined distance from each of the reference means, the position sensing apparatus will indicate that the object has moved beyond an accepted tolerance relative to its ideal vertical path of travel when the sensing means engages at least one of the reference means.

Throughout the specification and claims, reference is made to the sensing means being "normally displaced a predetermined distance from a respective one of the reference means". It should be understood that by "normally displaced" it is meant that predetermined distance the sensing means would be positioned from the reference means as the carriage moves along its path of travel.

In accordance with another aspect of the present invention, there is provided a position sensing apparatus for sensing displacement of a movable object relative to its ideal vertical path of travel. The apparatus includes an elongate reference means extending parallel to the ideal vertical path of travel of the object, and two sensing means mounted for movement with the object. Each of the sensing means is normally positioned a predetermined distance from a respective one of the elongate reference means. Each sensing means is movable into engagement with the respective one of the reference means such that displacement of the two sensing means when moved to engage the two elongate reference means is representative of the displacement of the object from and about its ideal vertical path of travel.

By having the sensing means displaced the predetermined distance from the elongate reference means and being movable into engagement with the reference means to measure the displacement of the sensing means from and about the elongate reference means, two measurements are obtained. These two measurements are the simple displacement of the object from its ideal path of travel. It should be understood that only the measurement obtained from one reference means and sensing means is required for simple displacement. The second measurement obtained is the twist of the object relative to its ideal vertical path of travel. To determine the twist or relative movement of the movable object about its ideal vertical path of travel, measurements must be taken from two reference means. Accordingly, the two sensing means are adapted to verify if the object is moving along its ideal vertical path of travel and, if the object is not moving along its ideal vertical path of travel, the sensing means can determine the relative displacement of the object from and about the ideal vertical path of travel. Should measurements be taken from the movable object, these measurements can be compensated by the sensed relative displacement measurements obtained by the position sensing apparatus.

The position sensing apparatus may further include support means connected to and extending away from the object for supporting each of the sensing means relative to its respective one of the elongate reference means. Each of the elongate reference means will extend parallel to and remotely from the ideal vertical path of travel of said object.

The support means may comprise two platform means upon which said sensing means is mounted and through which the elongate reference means may pass.

Each of the sensing means may comprise movable contact means normally positioned the predetermined distance from the respective one of the elongate reference means. The movable contact means generates a signal when moved into a position engaging the respective one of the elongate reference means. Each sensing means may include adjustment means operable to adjust the position of the movable contact means relative to the respective one of the elongate reference means and the object to move the contact means into engagement with the elongate reference means. The movable sensing means may include measurement means for measuring the amount of movable contact means is displaced to engage the respective one of the elongate reference means. The measurements of relative displacements of the movable contact means of the two sensing means represents the displacement of the object from its ideal vertical path of travel.

In accordance with a preferred application of the present invention, there is provided an apparatus for measuring the surface portions of an elongate article of manufacture. The apparatus comprises a frame to which the article is fixedly positioned and vertically supported, and a carriage movably mounted on the frame for travel along a vertical path. The carriage includes means for measuring the relative displacement of the surfaces of the article from reference positions of the measuring means. The apparatus includes a position sensing apparatus for sensing and measuring displacement of the carriage about and from its ideal vertical path of travel, and means for compensating the measurements of relative displacements of the surfaces with corresponding measurements relating to the sensed displacement of the carriage. The position sensing apparatus includes two elongate reference means extending parallel to the ideal vertical path of travel of the carriage, and two sensing means mounted for movement with the carriage. The sensing means are each normally positioned a predetermined distance from a respective one of the elongate reference means. Each sensing means is movable into engagement with its respective elongate reference means such that displacement of the two sensing means when moved to engage the two elongate reference means is representative of the displacement of the carriage from and about its ideal vertical path of travel.

In the apparatus described above, it is preferred that the two elongate reference means each comprise a wire suspended from said frame. The wire has a weight secured to its lower end such that the elongate reference means is in effect a plumb.

BRIEF DESCRIPTION OF THE DRAWINGS

For a better understanding of the nature and objects of the present invention, reference may be had by way of example to the accompanying diagrammatic drawings, in which.

DETAILED DESCRIPTION OF THE INVENTION

Figure 1:
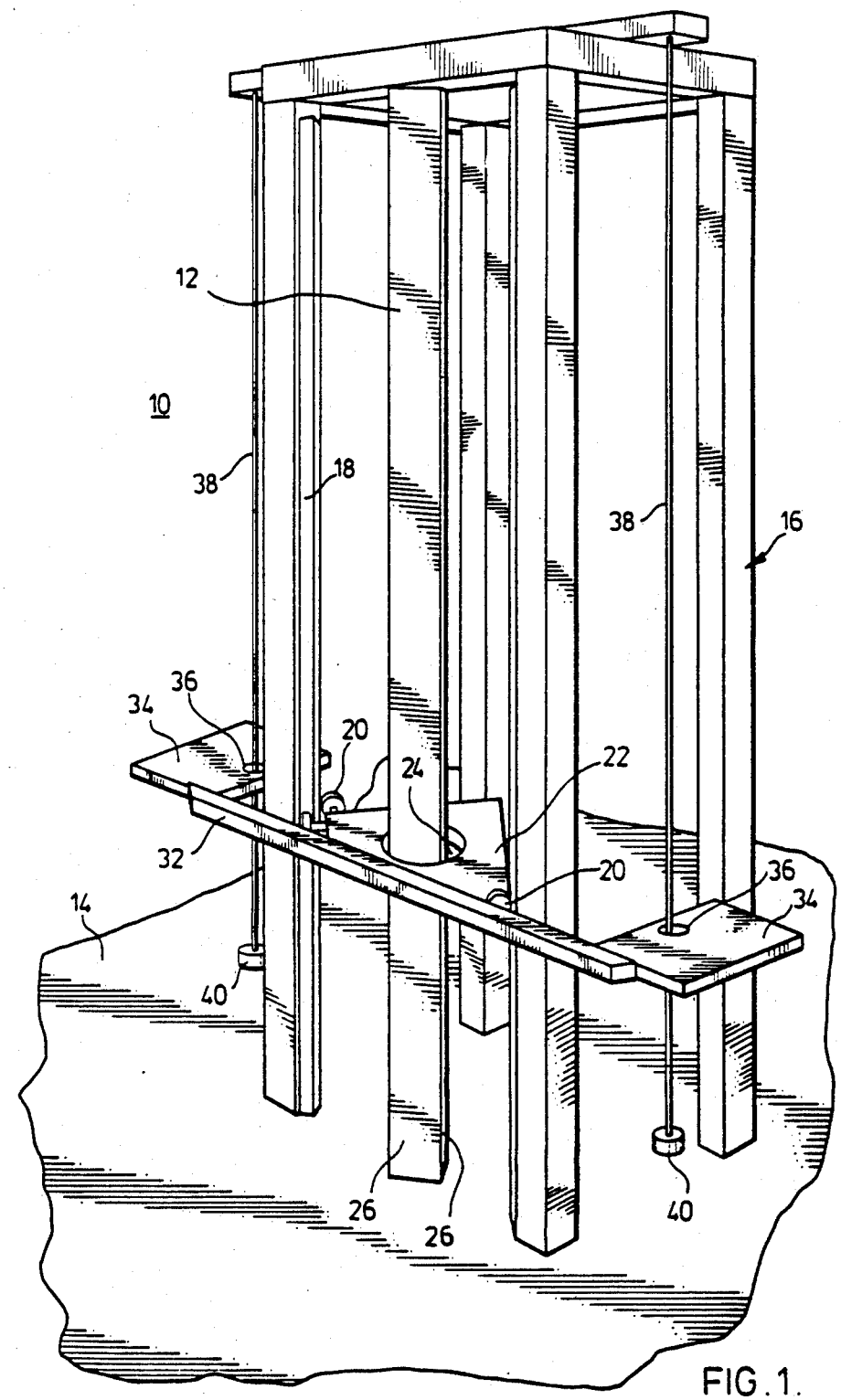
FIG. 1 is a perspective view showing an apparatus for measuring the straightness of an elongated article of manufacture which includes portions of the position sensing apparatus of the present invention.
Figure 2:
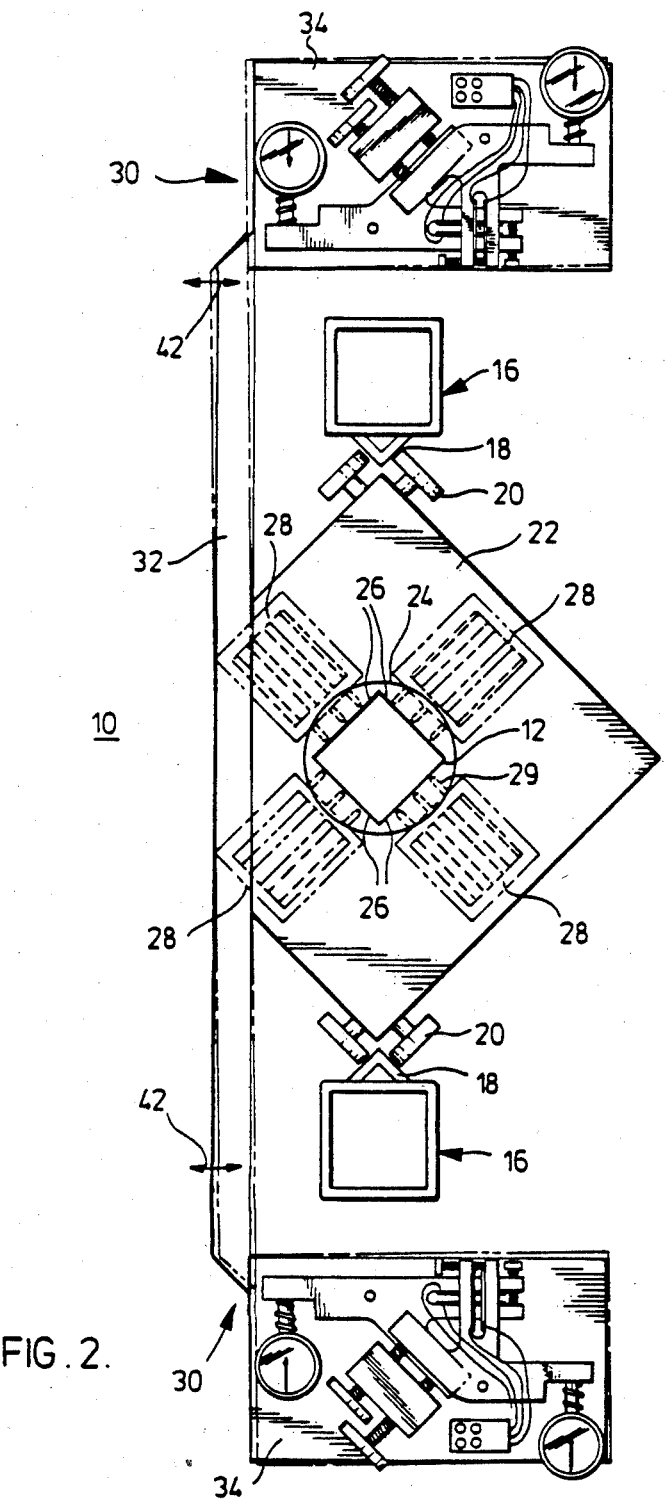
FIG. 2 is a top section view of the measuring apparatus of the present invention.

Referring to FIGS. 1 and 2 there is shown an apparatus 10 for measuring the straightness of an elongate article of manufacture or tubular member 12. The apparatus 10 extends vertically above a floor 14.

The apparatus 10 includes a frame 16 provided with two guide rails 18 for movably supporting wheels 20 of carriage or movable object 22. The carriage 22 is provided with central aperture 24 through which the article 12 passes. The article 12 is secured relative to the frame 16 such that the longitudinal axis and surfaces 26 of the article 12 are expected to extend vertically. A plurality of transducers or measuring means 28 are provided for measuring the twist, bow, angular displacement or other surface irregularities of the surfaces 26 of article 12. While it is not shown in the drawings, transducers 28 are interconnected by electrical wires to a computer which receives the data from the transducers 28 for recording and processing so as to determine the exact displacement of the surfaces 26 of the article 12 from reference positions determined by transducers 28.

During the operation of the measuring apparatus, the carriage 22 is raised by suitable means (not shown), such as, for example, a chain interconnecting carriage 22 with a drive motor mounted on top of frame 16. As the carriage is moved in predetermined steps upwardly and downwardly relative to the article 12, the transducers 28 have their ends 29 moved into engagement with an outside surface 26 of article 12. The amount that the transducers are moved is indicative of the displacement of the surfaces 26 of article 12 from reference positions determined by transducers 28.

Figure 3:
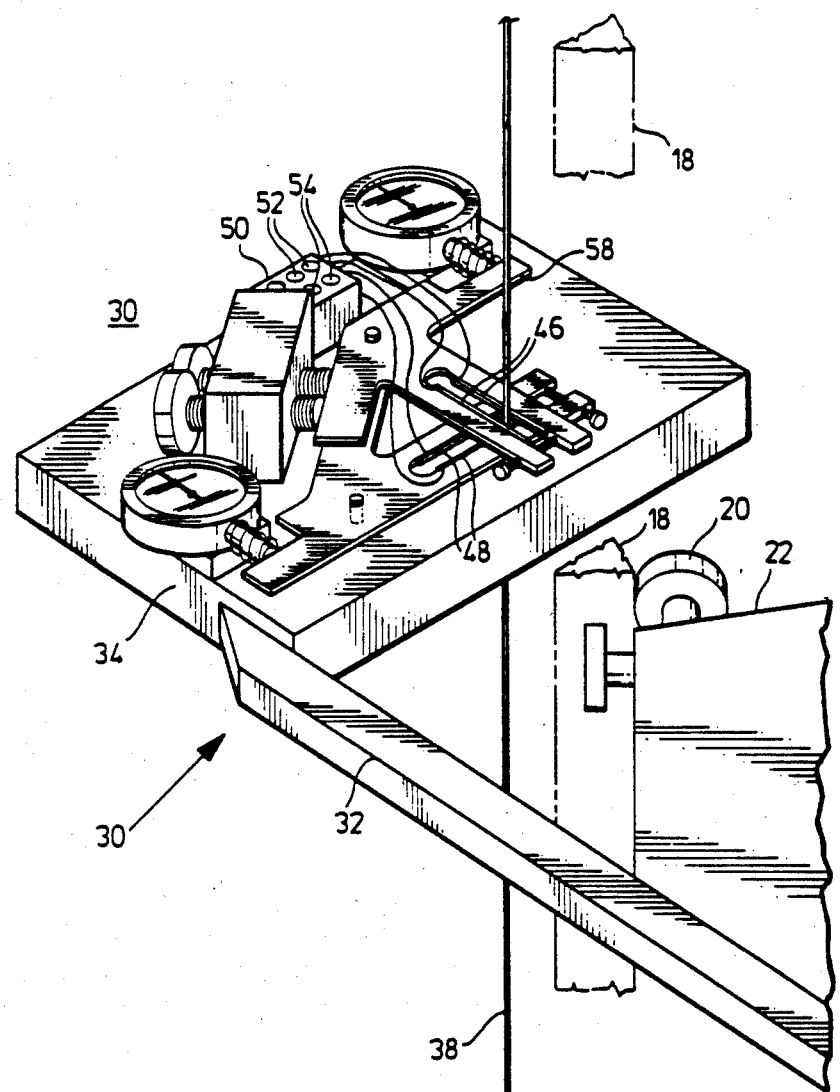
FIG. 3 is a perspective view showing the position sensing apparatus of the present invention.

In accordance with the present invention there is provided a position sensing apparatus 30. The position sensing apparatus 30 is positioned remotely from the article 12 by means of a support means or bar 32 and platforms 34. Bar 32 is bolted to the carriage 22 and supports platforms 34 outboard of the frame 16. The platforms 34 are provided with an aperture 36 through which an elongate reference means or wires 38 pass. As shown in the drawings, wires 38 are suspended from the frame 16 and are provided with weights 40 at their bottom ends. As shown in FIG. 3, the weight 40 is immersed in a bucket 42 of liquid such as oil 44, so as to dampen any vibration experienced by the wire 38.

The purpose of the position sensing apparatus 30 is to measure any displacement of the carriage 22 relative to the ideal vertical path of travel of the carriage 22. In other words, apparatus 30 measures transverse linear displacement of the carriage 22 in a predetermined horizontal plane relative to the article 12 and measures the twist or rotation of the carriage 22 about article 12 in the predetermined horizontal plane. To be effective, measurements of the displacement of the carriage 22 relative to wires 38 must be taken at predetermined intervals in accordance with any measurements of surfaces 26 of article 12 taken by the transducers 28. Further, the wire 38 must extend parallel to the ideal vertical path of travel of the carriage.

It should be understood that the compensating measurement made by the sensing means 30 does not have to be made with every article 12 tested because the rails 18 of frame 16 are rigid and are not expected to alter appreciably with each succeeding measurement. It may only be necessary for the information to be recorded from the sensing means 30 and processed by the computer on a periodic basis.

Figure 4:
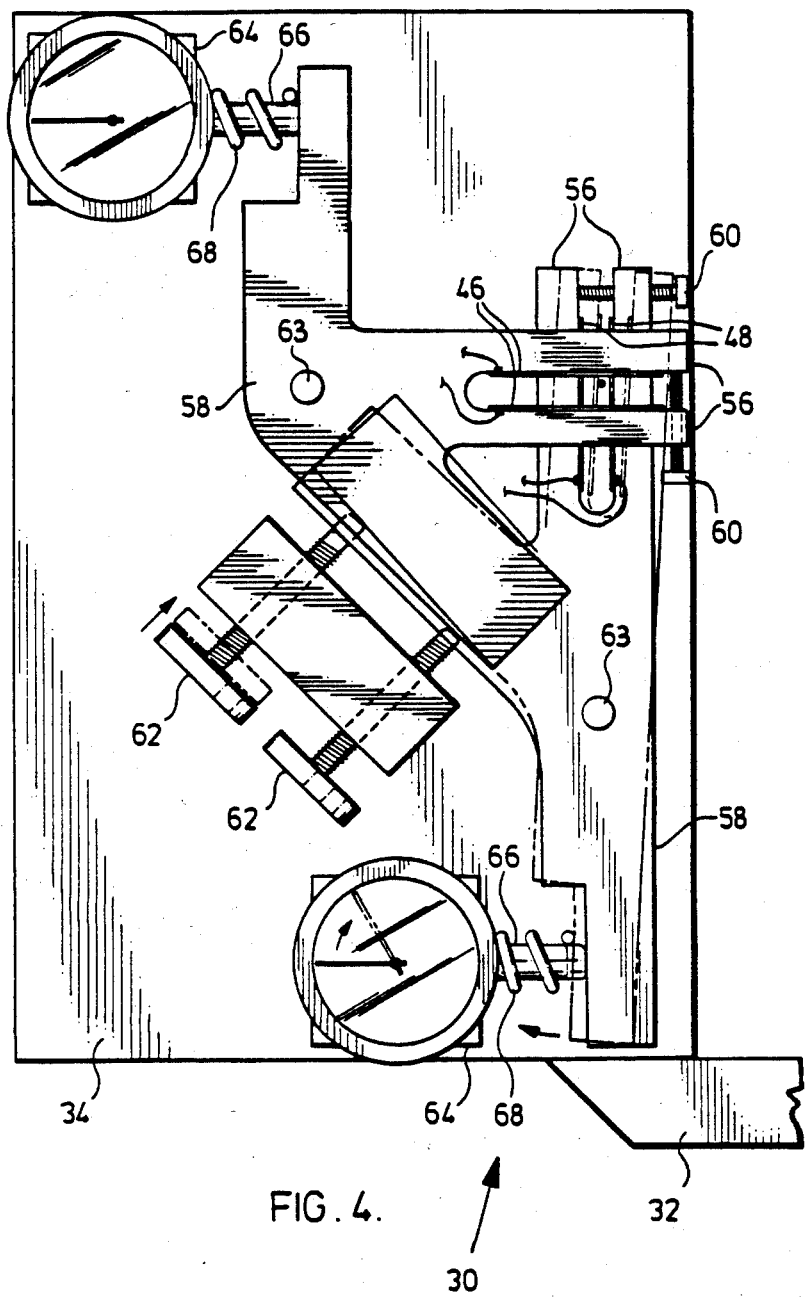
FIG. 4 is a top view showing some of the adjustment features of the position sensing apparatus of the present invention.

Sensing means 30 each include two pairs of movable contacts 46 and 48. The contacts 46 and 48 are shown in FIGS. 3 and 4 disposed at right angles to each other so as to be able to measure right angled X and Y coordinate displacements and provide information as to angular displacements of the carriage 22 relative to the article 12. The contacts 46 and 48 are connected through respective wires to a control terminal box 50 which is provided with light emitting diodes 52 and 54. The control mechanism or box 50 includes two high-gain operational amplifier circuits which are well known in the art and shall not be further described. The amplifiers act as switches when either one of each of the pairs of contacts 46 and 48 contacts the wire 38. When, for example, one contact 46 comes into contact with the wire 38, then one of lights 52 will be turned on. When this contact is moved out of engagement with wire 38 and the other contact 48 is moved into engagement with wire 38, the other of lights 54 will turn on. This provides a visual indication to the operator as to when the contacts are in engagement with the wire. It should be understood that the contacts are connected respectively to positive and negative voltages through the incandescent lamps 52 and 54 and because of the high gain of the amplifiers, a contact resistance of anything less than 100 kilo ohms will be sufficient to illuminate the diodes.

Each of the pairs of contacts 46 and 48 are mounted on two fingers 56 of a respective support means or arm 58. Each of the fingers 56 of each arm 58 is provided with an adjustment screw 60 which allows for the gap between the contacts 46 and 48 to be adjusted such that contacts 46 and 48 are displaced within a predetermined distance of the wire 38.

A second adjusting screw or adjustment means 62 is provided for each arm 58 so as to pivot the respective arm 58 about pivot point 63 causing the contacts 46 or 48 to be moved into engagement with wire 38 and turn on a respective light 52 or 54. The contact arms can be moved into engagement by either advancing or retreating the thumbscrew.

At the other end of the arm 58 remote from the contacts 46, 48, there is provided a measuring means in the form of a gauge 64. Gauge 64 has a plunger 66 in engagement with a respective arm 58 and a spring 68 for effecting the tension of the gauge. As the arm 58 is moved or pivoted about its respective pivot point 63 to bring the contacts 46, 48 into engagement with the wire 38, the dial on the face of the gauge moves allowing readings to be taken.

In operation, the gap between the contacts is set a predetermined distance such that the contacts do not touch the wire 38. This allows for the carriage to be moved upwardly and downwardly with respect to the article to be measured and keeps the sensing means away from the wire 38. However, in the event that the wire 38 is engaged by one of the contacts, this is indicative that the carriage is operating outside of acceptable limits or tolerances. In practice, measurements are taken periodically to determine the amount of deviation of the carriage from its ideal vertical path of travel. These measurements are taken by having a predetermined gap set between the contacts and by moving each contact into engagement with the wire. The gauge is read for the two different measurements of each pair of contacts. The measurements from each gauge are averaged and the average measurements provide X and Y coordinate displacements. As a result, the relationship between the displacements will provide information as to the transverse linear displacement of the carriage relative to the article and information as to the twist or rotation of the carriage about the article.

The information is then fed into a compensating means or computer for further use. As is known to those skilled in the art, the computer can be programmed to alter the transducers' measurement of the surface of the article with the information such that the deviation of the carriage from its vertical path does not adversely affect the transducer measurements. In effect, the position sensing apparatus of the present invention determines the actual, and thereafter expected, path of travel of the carriage.

I claim:

1. A position sensing apparatus for sensing displacement of a movable object relative to its ideal vertical path of travel, said apparatus comprising:
    two elongate reference means extending parallel to the ideal vertical path of travel of said object; and,
    sensing means mounted for movement with said object, said sensing means being normally positioned a predetermined distance from each of said elongate reference means whereby engagement of at least one of said elongate reference means by said sensing means is indicative of displacement of said object relative to its ideal vertical path of travel.

2. A position sensing apparatus for sensing displacement of a movable object relative to its ideal vertical path of travel, said apparatus comprising:
    two elongate reference means extending parallel to the ideal vertical path of travel of said object; and
    two sensing means mounted for movement with said object, each of said sensing means being normally positioned a predetermined distance from a respective one of said elongate reference means, and each said sensing means being movable into engagement with its respective reference means such that displacement of the two sensing means when moved to engage the two elongate reference means is representative of the displacement of said object from its ideal vertical path of travel.

3. The position sensing apparatus of claim 2 further including support means connected to and extending away from said object for supporting each of said sensing means relative to its respective one of the elongate reference means, each of said elongate reference means extending parallel to and remotely from the ideal vertical path of travel of said object.

4. The position sensing apparatus of claim 3 wherein said support means comprises platform means on each of which one of said sensing means is supported and through each of which the respective one of the elongate reference means passes.

5. The position sensing apparatus of claim 2 wherein each said sensing means comprises:
    movable contact means normally positioned the predetermined distance from the respective one elongate reference means, said movable contact means generating a signal when moved into a position engaging the respective one elongate reference means;
    adjustment means operable to adjust the position of said movable contact means relative to the respective one elongate reference means and said object to move said contact means into engagement with the respective one elongate reference means; and measurement means for measuring the amount said movable contact means is displaced to engage the respective one elongate reference means, the measurements of relative displacements of the movable contact means of each said sensing means being representative of displacement of said object from and about its ideal vertical path of travel.

6. An apparatus for measuring the surface position of an elongate article of manufacture comprising a frame to which said article is fixedly positioned and vertically supported and a carriage movably mounted on said frame for travel along a vertical path, said carriage including means for measuring the relative displacement of the surfaces of said article from reference positions of said measuring means, a position sensing apparatus for sensing and measuring displacement of said carriage about and from its ideal vertical path of travel, and means for compensating the measurements of relative displacement of the surfaces with corresponding measurements relating to the sensed displacement of the carriage, said position sensing apparatus including two elongate reference means extending parallel to the ideal vertical path of travel of said carriage and two sensing means mounted for movement with said carriage, each said sensing means being normally positioned a predetermined distance from a respective one of the elongate reference means, and each said sensing means being movable into engagement with its respective one of said elongate reference means such that displacement of said two sensing means when moved to engage said two elongate reference means is representative of the displacement of said carriage from and about its ideal vertical path of travel.

7. The apparatus of claim 6 wherein said two elongate reference means each extend parallel to and remotely from the ideal vertical path of travel of said carriage.

8. The apparatus of claim 7 wherein said two elongate reference means each comprises a wire suspended from said frame, said wire having a weight secured to its lower end.

9. The apparatus of claim 7 wherein said position sensing apparatus further includes two platform support means each connected to and extending away from said carriage to carry a respective one of said sensing means.

10. The apparatus of claim 9 wherein each said sensing means each includes:

at least one movable contact means normally positioned the predetermined distance from said elongate reference means, said contact means generating a signal when moved into a position engaging the respective one elongate reference means;

adjustment means operable to adjust the position of said one movable contact means relative to the respective one elongate reference means and said platform support means to move said one movable contact means into engagement with the respective one elongate reference means; and, measurement means for measuring the amount said one movable contact means is displaced to engage the respective one elongate reference means, the measurements of relative displacements of each of said one movable contact means being representative of displacement of said object from and about its ideal vertical path of travel.

11. The apparatus of claim 10 further including first and second contact means for each of said sensing means;

said first contact means comprising a first pair of contacts spaced apart a predetermined distance, each of said first pair of contacts being movable by a corresponding one of said adjustment means to engage the respective one elongate reference means thereby closing a first circuit and generating a first signal, the average displacement of said first pair of contacts to engage said one elongate reference means being measured by a corresponding one of said measurement means; and said second contact means comprising a second pair of contacts spaced apart a predetermined distance at right angles to said first pair of contacts whereby said first and second pairs of contacts measure displacement in two dimension, each of said second pair of contacts being movable by a corresponding adjustment means to engage the respective one elongate contact means and close a second circuit to generate a second signal, the average displacement of said second pair of contacts to engage the respective one elongate reference means being measured by a corresponding measurements means.

12. The apparatus of claim 11 wherein each of said pairs of contacts of said first and second contact means is mounted on respective contact arms having its own adjustment means to vary the spacing between said arms thereby varying the separation of each pair of contacts.

* * * * *